R. B. WOODWORTH.
WHEEL CONSTRUCTION.
APPLICATION FILED JAN. 27, 1909.
932,081.
Patented Aug. 24, 1909.
2 SHEETS—SHEET 1.
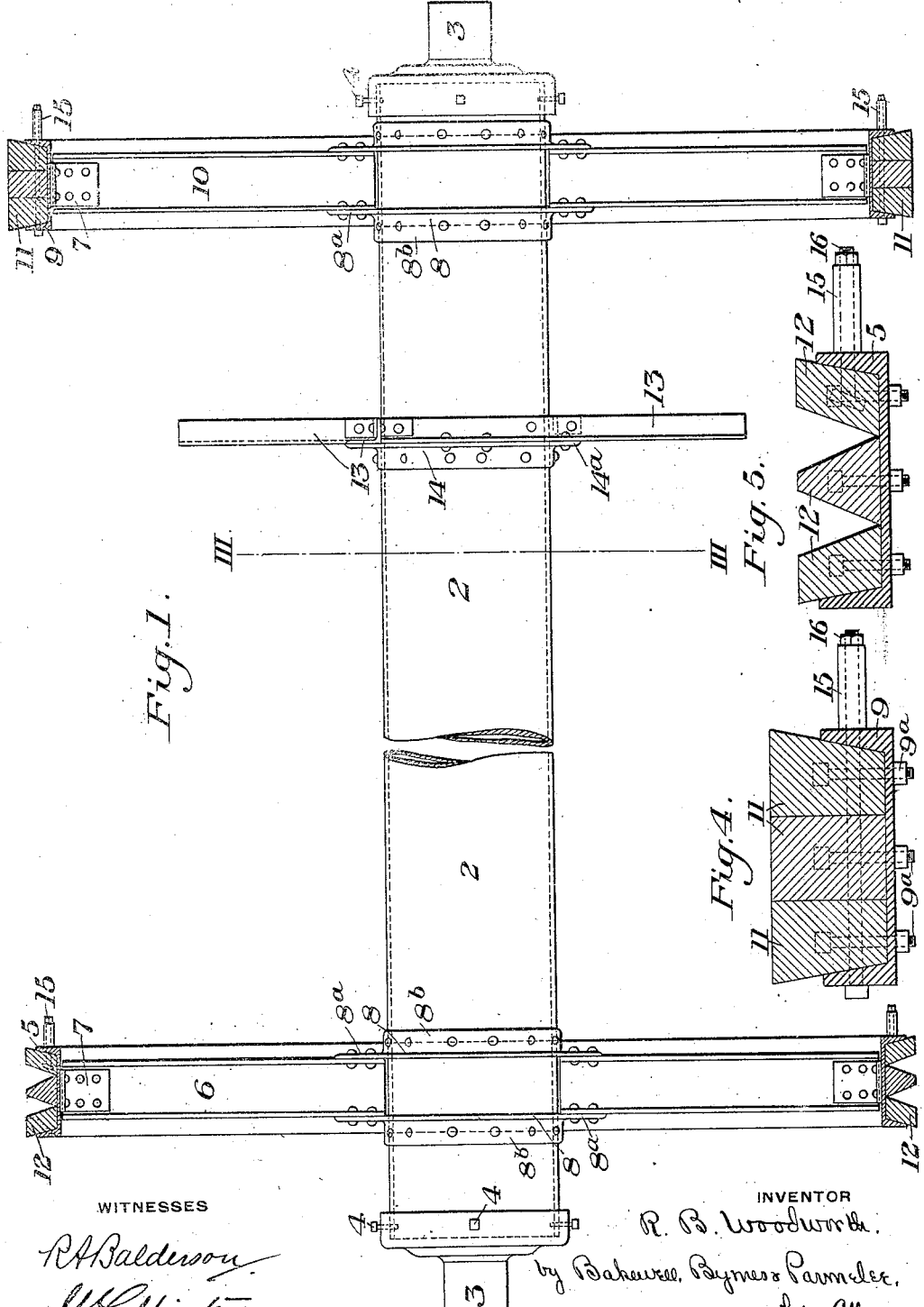
WITNESSES
R A Balderson
G L Winters
INVENTOR
R. B. Woodworth
by Bakewell, Byrnes & Parmelee
his Attys.

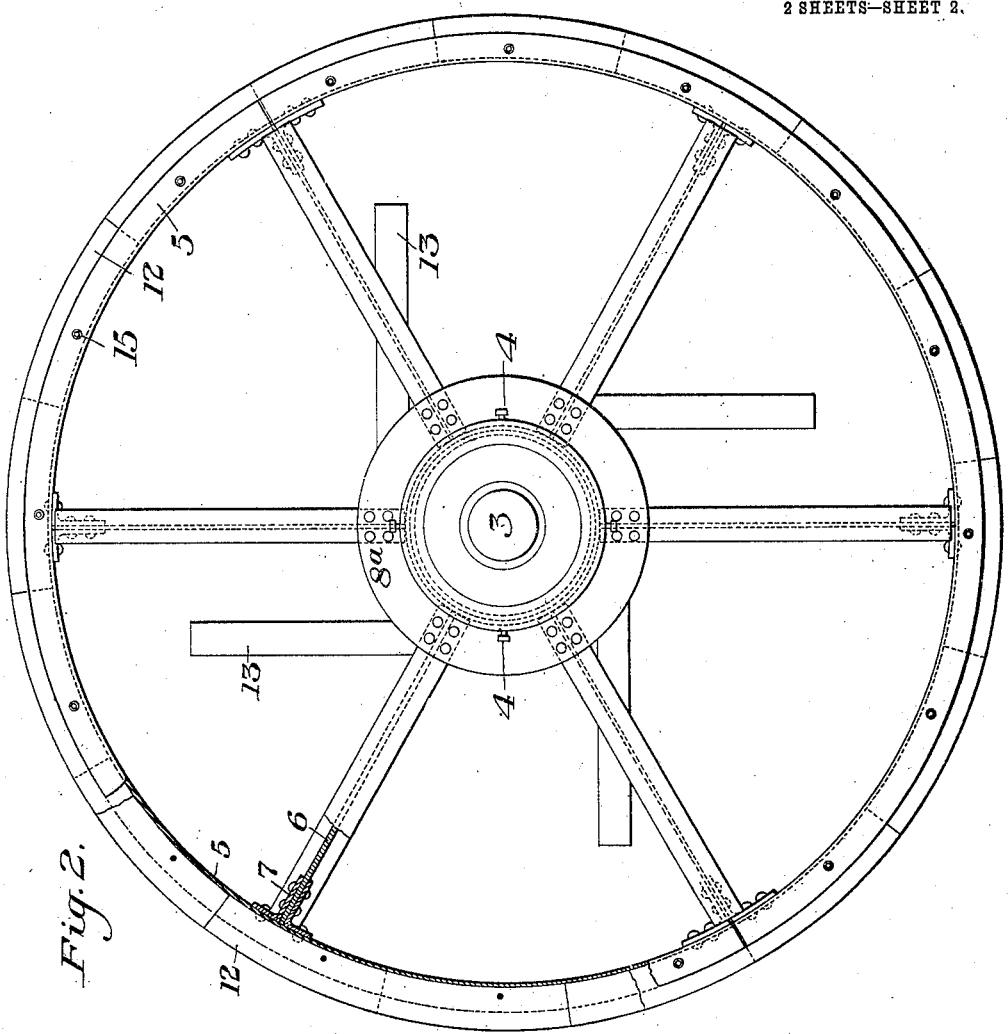
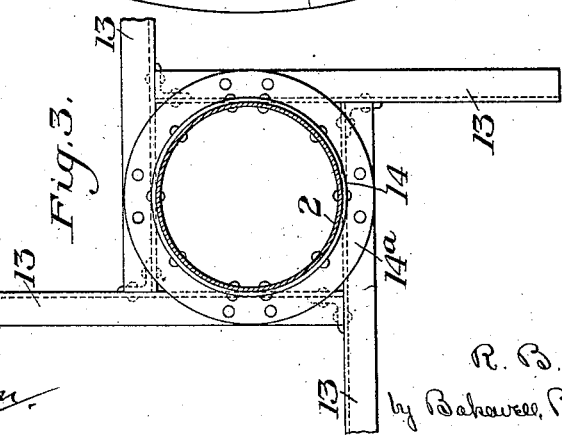

UNITED STATES PATENT OFFICE.

ROBERT B. WOODWORTH, OF PITTSBURG, PENNSYLVANIA.

WHEEL CONSTRUCTION.

932,081. Specification of Letters Patent. Patented Aug. 24, 1909.

Application filed January 27, 1909. Serial No. 474,471.

*To all whom it may concern:*

Be it known that I, ROBERT B. WOODWORTH, of Pittsburg, Allegheny county, Pennsylvania, have invented a new and useful Wheel Construction, of which the following is a full, clear, and exact description, reference being had to the accompanying drawings, forming part of this specification, in which—

Figure 1 is a side elevation partly in section of a wheel constructed in accordance with my invention; Fig. 2 is an end elevation partly in section of the same; Fig. 3 is a sectional end elevation on the line III—III of Fig. 1; Fig. 4 is a detail transverse section through the rim of the brake wheel, showing the removable segmental fillers secured to the rim of the wheel; Fig. 5 is a similar view showing the grooved wooden fillers secured to the metal rim of the rope drive of the wheel.

My invention relates to the construction of wheels and it more particularly relates to the construction of bull wheels and calf wheels used on rigs employed for drilling wells.

The object of my invention is to provide an improved wheel construction in which a strong and durable wheel is obtained which is light in weight and is of greatly increased strength.

Another object of my invention is to provide a wheel construction in which standard rolled metal shapes are employed in making the wheel.

In the drawings, 2 represents the shaft of a bull or calf wheel which is preferably formed of a standard wrought iron or steel pipe or tube and 3, 3 represent the trunnions of the shaft 2 which are removably secured to its ends by means of the screw-threaded bolts 4. A rope driving rim 5 which is formed by bending a standard rolled shape or channel of I beam form to the desired curvature, is secured to the outer end of the spokes 6 of the wheel. The spokes 6 are formed as shown of standard rolled beam shapes although channels or other standard shapes may be employed, which are fastened to the rim 5 by means of angle connections 7 these connections being preferably made from a section of standard rolled steel angle. The inner ends of the spokes 6 are riveted or otherwise secured to the vertical legs 8ª of the annular flange rings 8, the other legs 8ᵇ of these rings being riveted or otherwise secured in place on the pipe 2, forming the shaft for the wheel. At the opposite end of the shaft 2 is a brake wheel having a similar rim portion 9 which also is preferably formed from a bent rolled metal channel. The spokes 10 of this wheel are made from rolled steel shapes preferably of I beam form, and are secured to the rim 9 by means of similar connecting angles 7 and to the shaft 2 by similar flange rings 8.

To secure the proper bearing surface for the brake band wheel, the space between the flanges on the channel rim on the brake band end of the wheel construction, is lined with segmental fillers 11 of wood. The wooden fillers are made exact to templet and are secured in place on the channel rim by means of screw-threaded bolts 9ª as is shown in Fig. 4. The rim of the driving wheel end of the apparatus is also provided with segmental wooden fillers 12 which are secured in place in a similar manner to those on the channel rim of the brake wheel end of the wheel construction. In the driving wheel the wooden fillers 12 are shaped so as to form a series of annular V-shaped grooves for the driving ropes used in actuating such wheels. The grooves shown are made in the preferred form for use with manila driving ropes and where wire ropes are used instead, the form of the groove will be correspondingly changed.

Secured to the shaft 2 at a point in its length between the rope driving wheel and the brake wheel, is a plurality of outwardly extending arms or spokes 13 which divide the length of the shaft 2 into two parts, one being used for coiling the slack of the drilling rope, the other being used for the portion of the rope actually employed at any particular time in the drilling of the wells. The spokes or arms 13 are secured to the shaft 2 by means of the flange 14 which is formed from a rolled metal angle into the desired size and shape, the vertical leg 14ª of this angle being secured to the arms 13 in the same manner as the spokes 6 on the band wheel.

In order to turn the bull wheel by hand, the usual handles 15 are provided, in this case the handles being applied to the rim of the wheels in a novel manner, being formed from a piece of metal pipe which is securely held in place on the rim of the wheel by means of the bolts 16 as is best shown in Figs. 4 and 5.

The advantages of my invention will be appreciated by those skilled in the art. By the use of standard rolled metal shapes, a wheel construction is provided which is of very largely increased strength and which is of much less weight than the ordinary wooden construction. The apparatus is simple and can be easily and cheaply made.

Modifications in the arrangement and construction of the parts may be made without departing from my invention.

I claim:—

1. A wheel having a hollow tubular shaft, a rolled metal rim having peripheral flanges, rolled metal spokes between the rim and shaft, and angle connections for securing the spokes to the rim and shaft; substantially as described.

2. A wheel having a hollow tubular shaft, a rolled metal rim having peripheral flanges, rolled metal spokes between the rim and shaft, and angle connections for securing the spokes to the rim and shaft, and segmental wooden fillers between the peripheral flanges of the rim, said fillers being removable; substantially as described.

3. A wheel having a hollow tubular shaft, a rolled metal rim having peripheral flanges, rolled metal spokes between the rim and shaft, angle connections for securing the spokes to the rim and shaft, segmental wooden fillers between the peripheral flanges of the rim, and securing bolts for holding the wooden fillers in place on the rim; substantially as described.

4. A wheel having a hollow tubular shaft, a rolled metal rim having peripheral flanges, rolled metal spokes between the rim and shaft, angle connections for securing the spokes to the rim and shaft, segmental wooden fillers between the peripheral flanges of the rim, and securing bolts for holding the wooden fillers in place in the rim, the wooden fillers being independently removable; substantially as described.

5. A wheel having a hollow tubular shaft, trunnions secured to the ends of the shaft, a rolled metal rim having peripheral flanges, rolled metal spokes between the rim and shaft, and angle connections for securing the spokes to the rim and shaft; substantially as described.

6. A bull wheel having a hollow tubular shaft, rolled metal rims having peripheral flanges on opposite ends of said shaft, trunnions removably secured on the ends of said shaft, said wheel having metal spokes between the rims and the shaft and angle connections for securing the spokes to the rims and shaft; substantially as described.

7. A bull wheel having a hollow tubular shaft, rolled metal rims having peripheral flanges on opposite ends of said shaft, trunnions removably secured on the ends of said shaft; said wheel having metal spokes between the rims and the shaft, angle connections for securing the spokes to the rims and shaft, and a plurality of arms secured to the shaft intermediate of the two wheel rims on the shaft; substantially as described.

8. A bull wheel having a hollow tubular shaft, rolled metal rims having peripheral flanges on opposite ends of said shaft, trunnions removably secured to the ends of said shaft, said wheel having metal spokes between the rims and the shaft, angle connections for securing the spokes to the rims and shaft, a plurality of arms secured to the shaft intermediate of the two wheel rims in the shaft, and handles secured to the rim of at least one of said wheels; substantially as described.

In testimony whereof, I have hereunto set my hand.

ROBERT B. WOODWORTH.

Witnesses:
H. C. HUNT,
H. W. MAXSON.